United States Patent [19]
MacDonald

[11] 3,965,771
[45] June 29, 1976

[54] ADJUSTABLE HYDRAULIC CONTROL SYSTEM FOR A MOTOR GRADER

[75] Inventor: John Graham MacDonald, Goderich, Canada

[73] Assignee: Dominion Road Machinery Co. Limited, Goderich, Canada

[22] Filed: Oct. 15, 1974

[21] Appl. No.: 514,566

[52] U.S. Cl. .................................. 74/479; 74/512
[51] Int. Cl.² .......................................... G05G 11/00
[58] Field of Search .............. 74/99 R, 512, 471 R, 74/473 R, 524, 479

[56] References Cited
UNITED STATES PATENTS

| | | | |
|---|---|---|---|
| 2,903,904 | 9/1959 | Mackie | 74/512 |
| 2,985,031 | 5/1961 | Bennett | 74/512 |
| 3,282,123 | 11/1966 | Klingaman | 74/479 |
| 3,354,789 | 11/1967 | Schenkelberger | 74/479 |
| 3,710,644 | 1/1973 | Downing | 74/491 |

*Primary Examiner*—Samuel Scott
*Assistant Examiner*—Wesley S. Ratliff, Jr.

[57] ABSTRACT

An apparatus for selectively changing the neutral position of one or more control levers such as those found on the control console of a motor grader is disclosed. The apparatus comprises a bearing having a longitudinal axis; means for eccentrically mounting the bearing about a central axis which is spaced apart from and parallel to the longitudinal axis, the means for mounting the bearing permitting the bearing to revolve about the central axis; and means for selectively retaining the bearing in a plurality of desired radial positions relative to the central axis, an end of the control lever is secured to the bearing to permit the control lever to pivot about the longitudinal axis. A connecting rod has a first end pivotally connected to the control lever and a second end connected to a device which is to be activated by the control lever. The first end of the connecting rod pivots about an axis which is coincident with the central axis. The control lever moves the connecting rod to activate the device when the control lever is pivoted about the longitudinal axis while the bearing remains stationary. To change the neutral position of the control lever, the control lever is pivoted about the central axis as the bearing is revolving about the central axis.

9 Claims, 2 Drawing Figures

ADJUSTABLE HYDRAULIC CONTROL SYSTEM FOR A MOTOR GRADER

FIELD OF THE INVENTION

This invention relates to an apparatus for selectively changing the neutral position of one or more control levers and more particularly, to the use of such apparatus on a hydraulic control console of a motor grader to facilitate operation of the control levers from either a standing or seated position.

BACKGROUND OF THE INVENTION

On most motor graders and other types of construction machinery which have a plurality of hydraulic control levers for activating various functions of the machine, the control levers remain in the same neutral position when not in use. As so often happens, particularly during the operation of a motor grader in doing rough roadwork, the operator can run the machine in a seated position so that it is desirable to have the control levers in a lowered neutral position. On the other hand, when the operator is doing fine roadwork such as forming a ditch bed along the roadside, the operator usually prefers to operate the control levers in a standing position so that all of the functions of the machine can be observed and slight changes in the blade height and angle may be quickly made. In such an instance it is desirable to have the control levers in a more upright neutral position. However, most motor graders at present do not provide for an apparatus which can vary the neutral position of the control levers to facilitate standing and seated operation of the machine.

The apparatus according to this invention overcomes the above problem by providing means to adjust the neutral position of the control levers between upright to any desired tilted position to facilitate standing or seated operation of a machine. The apparatus also permits positioning of the control levers in the upright position to facilitate entry to and exit from the operator's cab. The apparatus comprises a bearing having a longitudinal axis, means for eccentrically mounting the bearing about a central axis which is spaced apart from and parallel to the longitudinal axis of the bearing, the means for mounting the bearing permitting the bearing to revolve or orbit about the central axis and means for selectively retaining the bearing in a plurality of desired radial positions relative to the central axis so as to provide a plurality of different neutral positions for the control lever. The relationship of the essential elements of the invention is that an end of a control lever is secured to the bearing to permit the control lever to pivot about the longitudinal axis of a shaft it is mounted on. A connecting rod has a first end pivotally connected to the control lever, and a second end connected to a device which is to be activated by the control lever. The first end of the connecting rod pivots about an axis which is coincident with the central axis of the apparatus. When it is desired to activate the device with the control lever, the control lever is pivoted about the longitudinal axis of the shaft to move the connecting rod. However, when it is desired to change the neutral position of the control lever, the control lever pivots about the central axis as the bearing is revolved about the central axis to change the radial position of the control lever relative to the central axis. During this changing of the neutral position of the control lever the connecting rod may remain stationary. The means for retaining the bearing in the desired radial position is used when the new neutral position of the control lever is attained.

As mentioned hereinabove, the apparatus may be part of the hydraulic control console of a motor grader and the like where the plurality of control levers of the console may be positioned in a number of different neutral positions in unison.

The means for eccentrically mounting the bearing may comprise one or more arms, a first end of each arm being connected to an end of the shaft on which the bearing is mounted and a second end of each arm being rotatively mounted about the central axis of the apparatus. The means for selectively retaining the bearing of the apparatus in a plurality of desired radial positions may be integral with one of the arms and include a quadrant-shaped body portion which is attached to the bearing. It may have an apex which is mounted adjacent the central axis and a diametrically opposed arced surface wherein a plurality of circumferentially spaced-apart notches are located. A spring-loaded arm may be used which is pivoted about an axis and permits the arm to engage any one of the notches to retain the bearing of the apparatus in the desired radial position thereby retaining the control lever in the desired neutral position.

BRIEF SUMMARY OF THE INVENTION

It is an object of the invention to provide an apparatus of simple construction which may be used for changing the neutral position of one or more control levers, to facilitate operation of a machine in either standing or seated position.

It is another object of the invention to adapt the apparatus according to the invention for use on a hydraulic lever control console of a motor grader.

It is a further object of the invention to provide an apparatus which adjusts the neutral position of the control levers without activating the device which the control lever controls.

BRIEF DESCRIPTION OF THE DRAWINGS

These and other objects, advantages and features of the preferred embodiments of the invention will become apparent in the following detailed description of the drawings wherein.

DETAILED DESCRIPTION OF THE PREFERRED EMBODIMENTS

Figures 1, 2:
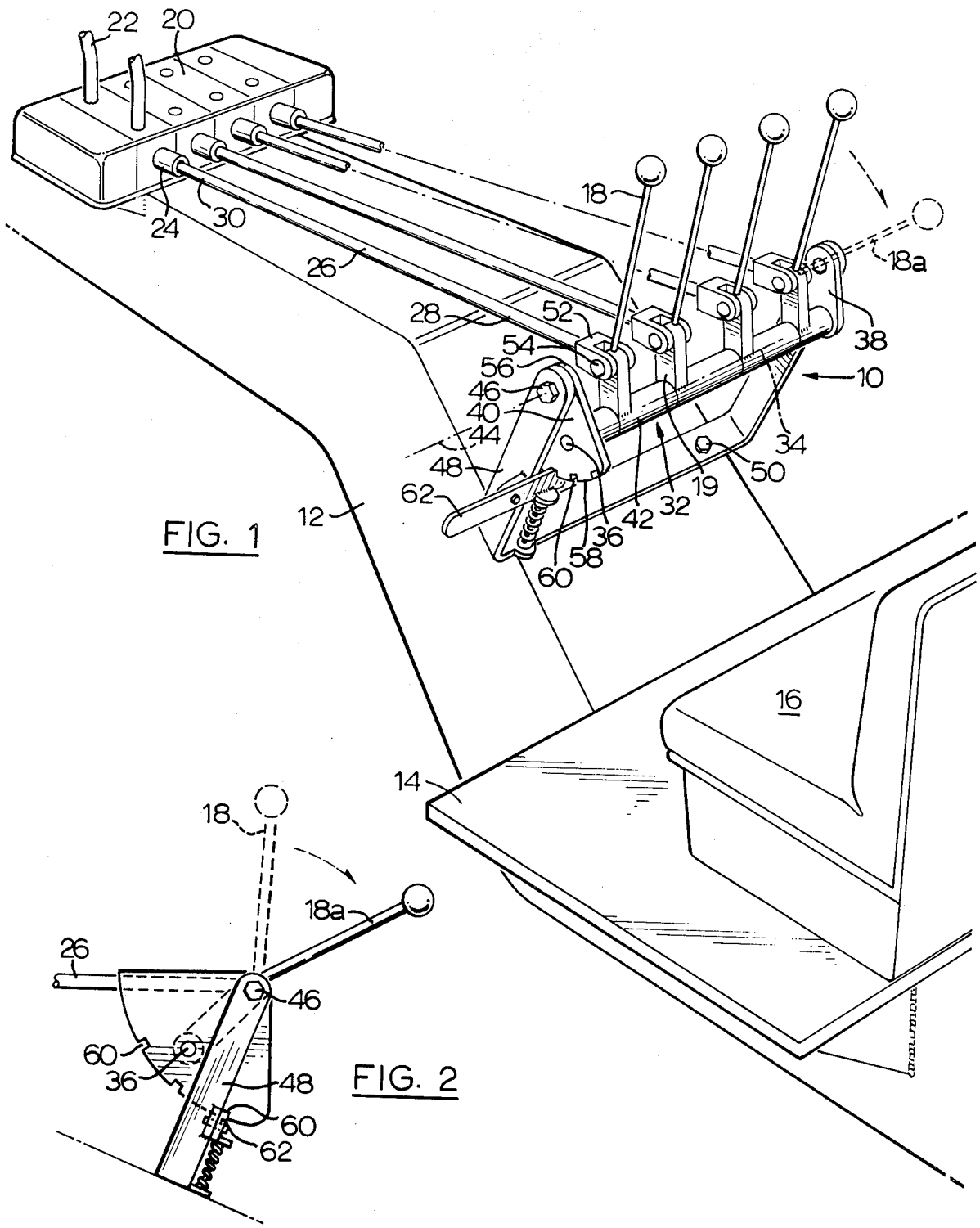
FIG. 1 is a perspective view of the apparatus which is mounted on the frame of a motor grader.
FIG. 2 is a side view of the apparatus where an alternate neutral position of the control levers is shown.

A preferred embodiment according to the invention is shown in FIG. 1 where the apparatus generally designated at 10 is mounted on the frame 12 of a motor grader having a platform 14 and an operator's seat 16. The control levers 18 which are mounted on the apparatus 10 control several hydraulic valves 20. Each hydraulic valve 20 includes inlet and outlet hydraulic hoses 22 and a spool 24 which is shown in its neutral position. A connecting rod 26 which has a first end 28 pivotally connected to a control lever 18 and its second end 30 connected to the respective spool 24 permits the operator to activate hydraulic valve 20 upon forward or backward movement of control lever 18 to move spool 24 out of neutral position and direct the flow of hydraulic oil through hoses 22. The direction of flow of hydraulic oil through inlet and outlet hoses 22 is determined by the direction of movement of the control lever. The hydraulic oil flows under pressure through the control valve 20 when it is open to control a function of the motor grader in accordance with normal practice.

The bearing assembly of the apparatus is generally designated at 32 and has a longitudinal axis 34. Each of the control levers 18 has an end 19 secured to a bearing collar 42. The plurality of bearing collars 42 are mounted on a common shaft 36 having a longitudinal axis which is coincident with the longitudinal axis 34 of the bearing assembly 32. Each of the control levers 18 is therefore permitted to pivot about the longitudinal axis 32 independently of the other control levers by way of the respective bearing collar 42.

The bearing assembly 32 is mounted about central axis 44 by arms 38 and 40 each of which has an end connected to common shaft 36 and the other end mounted for rotation about central axis 44 by means of pins 46. U-shaped support member 48 is secured to the motor grader frame 12 by bolts 50 and the end of each leg of support member 48 is connected to arms 38 and 40 so that the bearing assembly's longitudinal axis 34 can rotate or revolve about central axis 44 where the longitudinal axis 34 is offset from the central axis 44 by the arms 38 and 40.

The first end 28 of each connecting rod 26 is pivotally connected to the respective control lever 18 above collar 42 by way of a clevice 52 and pin 54. Each first end 28 of the connecting rod is pivotally connected to the control lever 18 in such a manner that the longitudinal axis of each pin 54 is coincident with the central axis 44.

One of the arms 40 has the shape of a quadrant body portion having an apex 56 which is adjacent the central axis 44 and a diametrically opposed arced surface 58 having a plurality of circumferentially spaced-apart notches 60. A spring-loaded arm 62 is pivotally mounted on a leg of the U-shaped support member 48 and pivots about an axis so as to engage one of the desired notches 60. By releasing arm 62 from a notch 60, the bearing assembly 32 is free to revolve or orbit about central axis 44. Since the axis about which the first ends 28 of the connecting rods pivot about and is coincident with the central axis 44, then as the bearing assembly 32 revolves about the central axis 44, the neutral position of the control lever 18 can be changed to a new radial position 18a with respect to said central axis 44.

The new radial position 18a of the control lever is more clearly shown in FIG. 2 where the movement of bearing assembly 32 about the central axis 44 has resulted in a new position for shaft 36. Arm 62 is inserted in one of the other notches 60 to retain the bearing assembly 32 in the new desired radial position 18a.

As the bearing assembly 32 revolves about the central axis 44 the connecting rod 26 remains stationary because the pivotal axis of each first end 28 is coincident with the central axis 44. The spools are usually spring-mounted in the hydraulic valves 20 and a substantial push or pull on the control lever 18 is required to move the spool 24 out of neutral position. Providing the bearing assembly 32 and the pins 46 are well lubricated the neutral position of the control lever 18 may be changed by grasping one of the control levers, releasing arm 62 from the respective notch and moving the control lever to the new position, without moving the connecting rod 26 because of the resistance exerted by the springs used to retain the spool 24 in neutral position. Once the arm 62 is locked in the respective notch then a push or pull on the control lever 18 will be transferred directly to the spool 24 by connecting rod 26 to move the spool out of neutral position. On the other hand, it is understood that the neutral position of control levers 18 may be changed by simply releasing arm 62, grasping bearing assembly 32, and moving it about central axis 44 until the new desired position of the control levers is attained.

The apparatus according to this invention therefore provides a control console for a motor grader whereby the neutral position of the control levers 18 may be adjusted to facilitate either standing or seated operation of the machine and entrance to and exit from the cab by the operator.

Although various preferred embodiments of the invention have been described in detail herein, it is understood that variations may be made thereto without departing from the spirit of the invention or the scope of the appended claims.

We claim:
1. An apparatus for changing the neutral position of a control lever comprising:
   1. a bearing having a longitudinal axis;
   2. means for eccentrically mounting said bearing about a central axis which is spaced apart from and parallel to said longitudinal axis, said means for mounting said bearing permitting said bearing to revolve about said central axis;
   3. means for selectively retaining said bearing in a plurality of desired radial positions relative to said central axis;

an end of the control lever being secured to said bearing to permit the control lever to pivot about said longitudinal axis, a connecting rod having its first end pivotally connected to the control lever and its second end connected to a device which is to be activated by the control lever; the first end of a connecting rod being positioned on the control lever so that said first end pivots about an axis which is coincident with said central axis; the control lever moving the connecting rod to activate the device when the control lever is pivoted about said longitudinal axis while said bearing remains stationary; and the control lever pivoting about said central axis when said bearing revolves about said central axis to change the radial position of the control lever relative to said central axis.

2. An apparatus of claim 1 wherein said bearing is mounted on a shaft having a longitudinal axis which is coincident with the longitudinal axis of said bearing, said means for eccentrically mounting said bearing comprises an arm, a first end of which is secured to an end of the shaft and a second end of which is rotatively mounted about said central axis which is positioned exterior of the periphery of said bearing; said arm spacing said longitudinal axis away from said central axis so that said first end of the connecting rod pivots about an axis which is coincident with said central axis.

3. An apparatus of claim 2 wherein an arm is secured to each end of the shaft, one of said arms carrying said means for selectively retaining said bearing in a plurality of desired radial positions with respect to said central axis.

4. An apparatus of claim 3 wherein said means for selectively retaining said bearing in a plurality of desired radial positions comprises a quadrant-shaped body portion having an apex and a diametrically opposed arced surface, the body portion being integral with one of said arms, said apex being mounted adjacent said central axis, and said arced surface having a plurality of circumferentially spaced-apart notches, a spring loaded arm being pivoted about an axis to permit said arm to engage a desired one of said notches to position the control lever in the desired radial position with respect to said central axis.

5. An apparatus of claim 1 wherein said connecting rod remains stationary during movement of said bearing about said central axis when the radial position of the control lever is adjusted.

6. In a hydraulic control console having a plurality of control levers which are adjustable to various neutral positions, each control lever having a bearing member at one end thereof, each of said bearing members being mounted on a common shaft to permit each said control lever to pivot independently about the longitudinal axis of said shaft, at least one arm, a first end of each arm being attached to said common shaft and a second end of each arm being mounted to rotate about a central axis which is spaced-apart from said longitudinal axis, said at least one arm permitting said common shaft to revolve about said central axis; a plurality of connecting rods, a first end of each connecting rod being pivotally connected to a respective control lever and a second end of each connecting rod being connected to a device to be controlled by the respective control lever; the first end of each of said connecting rods being positioned on the respective control lever so that each said first end pivots about an axis which is coincident with said central axis; and means for retaining said common shaft in a plurality of desired radial positions relative to said central axis; all of the control levers pivoting about said central axis when said bearing revolves about said central axis to change the neutral position of all the control levers.

7. In a hydraulic control console of claim 6 an arm being provided at each end of said common shaft where a U-shaped member is used to mount said second end of each arm for rotation about said central axis; a second bearing being secured in the end of each leg of said U-shaped member where the longitudinal axis of each second bearing is coincident with said central axis; the second end of each arm being so mounted on the respective second bearing to align the pivotal axis of each first end of said connecting rods with said central axis.

8. In a hydraulic control console of claim 7 wherein said means for retaining said common shaft in a plurality of desired radial positions comprises a quadrant-shaped body portion having an apex and a diametrically opposed arced surface, the body portion being integral with one of said arms, said apex being mounted adjacent said central axis and said arced surface having a plurality of circumferentially spaced-apart notches with respect to said central axis; a spring-loaded arm being pivotally mounted on the respective leg of said U-shaped member about an axis which permits said arm to engage a desired one of said notches to position said control levers in the desired neutral position with respect to said central axis.

9. In a hydraulic control console of claim 6 where each of said connecting rods remains stationary when said common shaft is revolved about said central axis to change the neutral position of all the control levers with respect to said central axis.

* * * * *